United States Patent
Giaccari et al.

(10) Patent No.: US 11,302,075 B1
(45) Date of Patent: Apr. 12, 2022

(54) MEDIAL SURFACE CONSTRUCTION FOR SOLID MODELS USING TETRAHEDRAL MESHES

(71) Applicant: Ansys, Inc., Canonsburg, PA (US)

(72) Inventors: Luigi Giaccari, Canonsburg, PA (US); Vaibhav Kurade, Canonsburg, PA (US); Hanzhou Zhang, Canonsburg, PA (US); Young Kyu Lee, Canonsburg, PA (US)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 17/076,890

(22) Filed: Oct. 22, 2020

(51) Int. Cl.
*G06T 17/20* (2006.01)

(52) U.S. Cl.
CPC .......... *G06T 17/20* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 2008/0002889 | A1* | 1/2008 | Shimada | G06T 17/30 382/197 |
| 2009/0271156 | A1* | 10/2009 | Kageura | G06T 17/20 703/1 |
| 2018/0031721 | A1* | 2/2018 | Etiene Queiroz | G06T 17/05 |

* cited by examiner

*Primary Examiner* — Michelle Chin
(74) *Attorney, Agent, or Firm* — Jones Day

(57) ABSTRACT

Data is received that encapsulates a model of a solid object. The model includes a set of boundary surfaces that are approximately parallel to a medial surface of the solid object. Thereafter, a tetrahedral mesh is generated to represent an interior of the solid object with tetrahedral elements having nodes located on the boundary surfaces. Cuttings are generated for each tetrahedral element based on the nodes. These generated cuttings are used to construct a representation of the medial surface of the solid object. Related apparatus, systems, techniques and articles are also described.

20 Claims, 16 Drawing Sheets

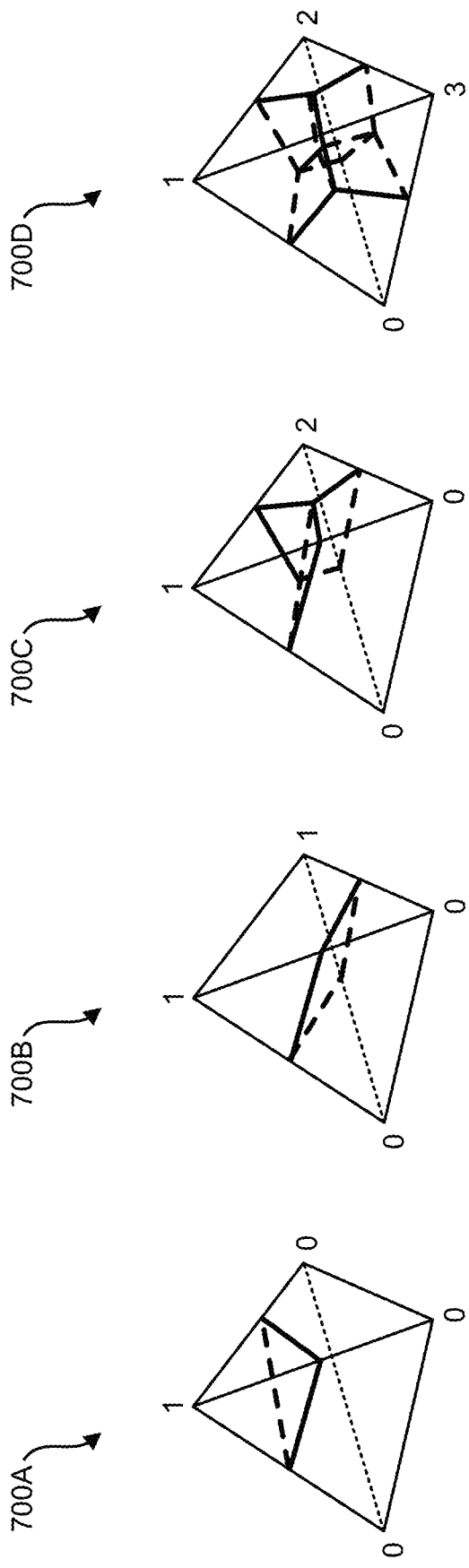

MEDIAL SURFACE CONSTRUCTION FOR SOLID MODELS USING TETRAHEDRAL MESHES

TECHNICAL FIELD

The subject matter described herein relates construction of medial surfaces for solid models using tetrahedral meshes.

BACKGROUND

The medial surface is a surface simplification of a solid object. Medial surfaces allow efficient computations for different applications such as shell analysis of thin solid parts. Conventional technologies to construct a medial surface for non-manifold connected solids typically decompose the problem into multiple manifold sub-problems in which each manifold medial surface is connected together which is an approach that is fraught for error. A non-manifold medial connected solid is a three dimensional (3D) shape that cannot be unfolded into a two dimensional (2D) surface with all its normals pointing in the same direction. Normal is a vector that is perpendicular to the surface of an object. While decomposing a medial surface into multiple manifold sub-problems is easier to model, inaccuracies arise when connecting such multiple manifold sub-problems.

SUMMARY

In a first aspect, data is received that encapsulates a model of a solid object. The model includes a set of boundary surfaces that are approximately parallel to a medial surface of the solid object. Thereafter, a tetrahedral mesh is generated to represent an interior of the solid object with tetrahedral elements having nodes located on the boundary surfaces. Cuttings are generated for each tetrahedral element based on the nodes. These generated cuttings are used to construct an approximation of the medial surface of the solid object.

The cuttings can be polygons and/or lines.

In some variations, the set of boundary surfaces that are approximately parallel to the medial surface of the solid object can be identified. For example, the solid object can be visualized (e.g., displayed, etc.) in a graphical user interface and user-generated input can be received via the graphical user interface selecting the set of boundary faces that are approximately parallel to the medial surface of the solid object.

The solid object can take various forms including a non-manifold connected solid object.

Vertices of the nodes can be coded based on the boundary surface on which they are located. The cuttings for each tetrahedral element can be based on an associated template for the respective codes for the corresponding nodes. One of four codes can be assigned to each vertex based on a contiguity of parallel faces on which such vertex resides.

The tetrahedral mesh can be generated so as to only have nodes on the boundary surfaces and no interior nodes.

The constructing the approximation of the medial surface of the solid object comprises can include combining each of the cuttings.

Non-transitory computer program products (i.e., physically embodied computer program products, non-transitory computer readable media, etc.) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or tahe like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages.

For example, the current subject matter allows for the construction of a medial surface for non-manifold solid objects using reduced computing resources.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7A is a diagram illustrating generating a cutting polygon for a tetrahedral element having a first vertex coding;

FIG. 7B is a diagram illustrating generating a cutting for a tetrahedral element having a second vertex coding;

FIG. 7C is a diagram illustrating generating a cutting for a tetrahedral element having a third vertex coding;

FIG. 7D is a diagram illustrating generating a cutting for a tetrahedral element having a fourth vertex coding;

Like reference symbols in the various drawings indicate like elements.

DETAILED DESCRIPTION

The current subject matter is directed to enhanced techniques for defining a medial surface of an object with particular application to non-manifold connected solid objects. In particular, the current subject matter systematically constructs a representation of a medial surface (e.g., an approximated medial surface) using a complete set of tetrahedral templates which, in turn, are used to generate cuttings that can deal with varying non-manifold geometries.

Figure 1:
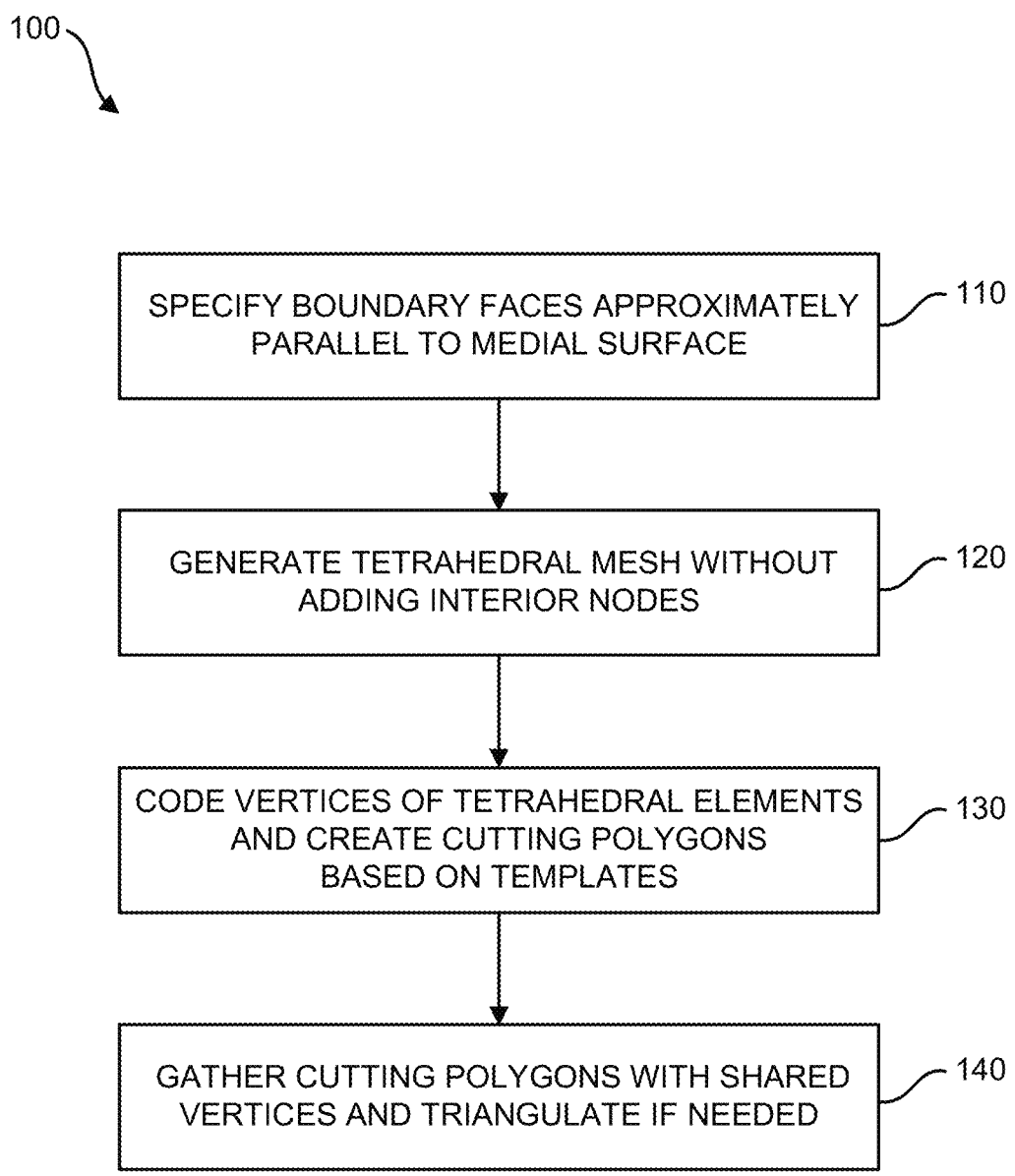
FIG. 1 is a first process flow diagram illustrating calculating a medial surface for a solid object.

Diagram 100 of FIG. 1 illustrates a process for constructing a medial surface for a solid object. The solid object is described by a set of boundary faces. Among the faces, at 110, the boundary faces approximately parallel to the medial surface are identified either by user input via a graphical user interface or in an automated way. For example, each triangle in the surface mesh shares two nodes of a side with only a single other triangle. Using this property, it is always possible to order the three vertices of each and every triangle in a consistent direction/orientation. Most of opposing sides have triangles facing opposite direction and the dot products of their normal vectors are close to −1. The remaining faces are called the side faces. Thereafter, at 120, a boundary triangular mesh is generated by a surface mesh generation tool. A tetrahedral mesh is generated inside of the solid object such that there are no additional nodes are generated inside of the solid object. In other words, the tetrahedral mesh is generated only by the nodes on the boundary. For each tetrahedral element, at 130, four vertex codes are evaluated based on the contiguity of the parallel faces. As will be described in further detail below, the cuttings can be generated in the tetrahedral elements by matching their corresponding codes with a limited set of templates which define how the corresponding cutting is to be constructed/represented. Next, at 140, the cuttings from all the tetrahedral elements can be gathered/combined to collectively represent a medial surface of the solid object.

Figure 2:
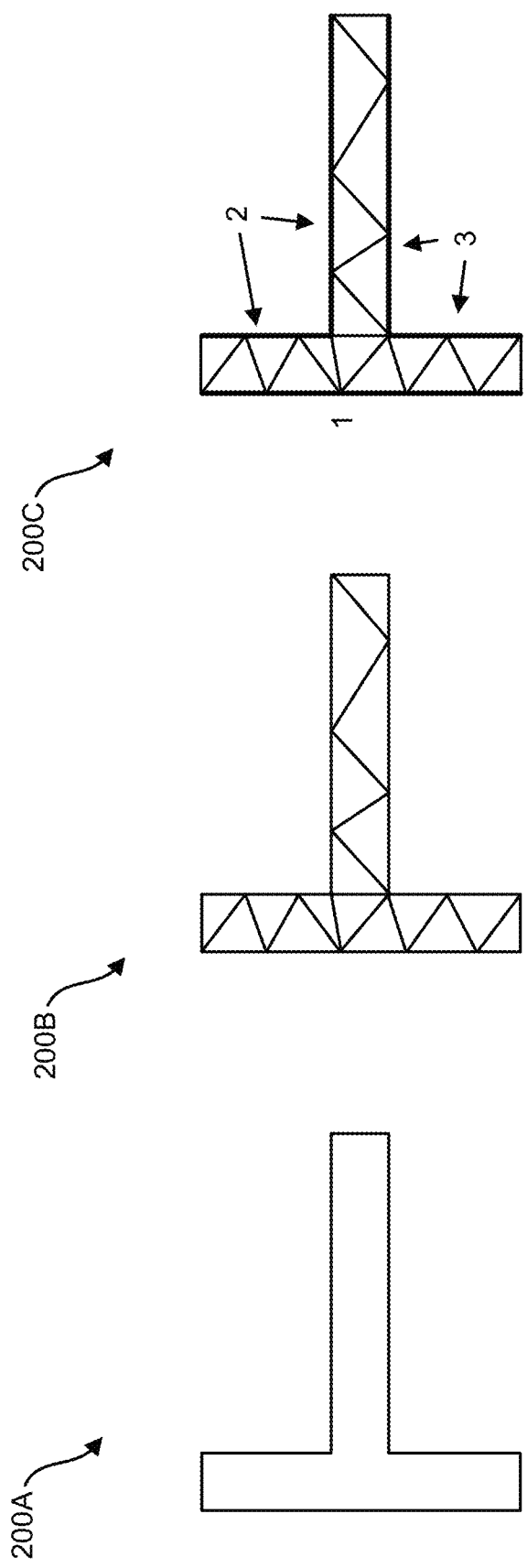
FIG. 2A is a diagram illustrating a 2D solid object.
FIG. 2B is a diagram illustrating a mesh of the solid object of FIG. 2A.
FIG. 2C is a diagram illustrating identification of boundary surfaces approximately parallel to a medial surface of the solid object of FIG. 2A.

FIGS. 2A-2C are diagrams 200A-200C illustrates tetrahedral mesh generation using two dimensional (2D) drawings. FIG. 2A represents a solid whose tetrahedral mesh is generated as shown in FIG. 2B. It is important to note that the boundary faces approximately parallel to the medial surface are identified as marked with the bold lines in FIG. 2C. Furthermore, the parallel boundary faces are coded in contiguous regions as shown in FIG. 2C such that each contiguous surface is coded with a different number (e.g., 1, 2, 3, etc.). Stated differently, each contiguous surface can be assigned a different number (i.e., coded). Vertices of the tetrahedral mesh which fall on these parallel boundary faces are assigned the corresponding codes (e.g., 1, 2, 3, etc.)

Figure 3:
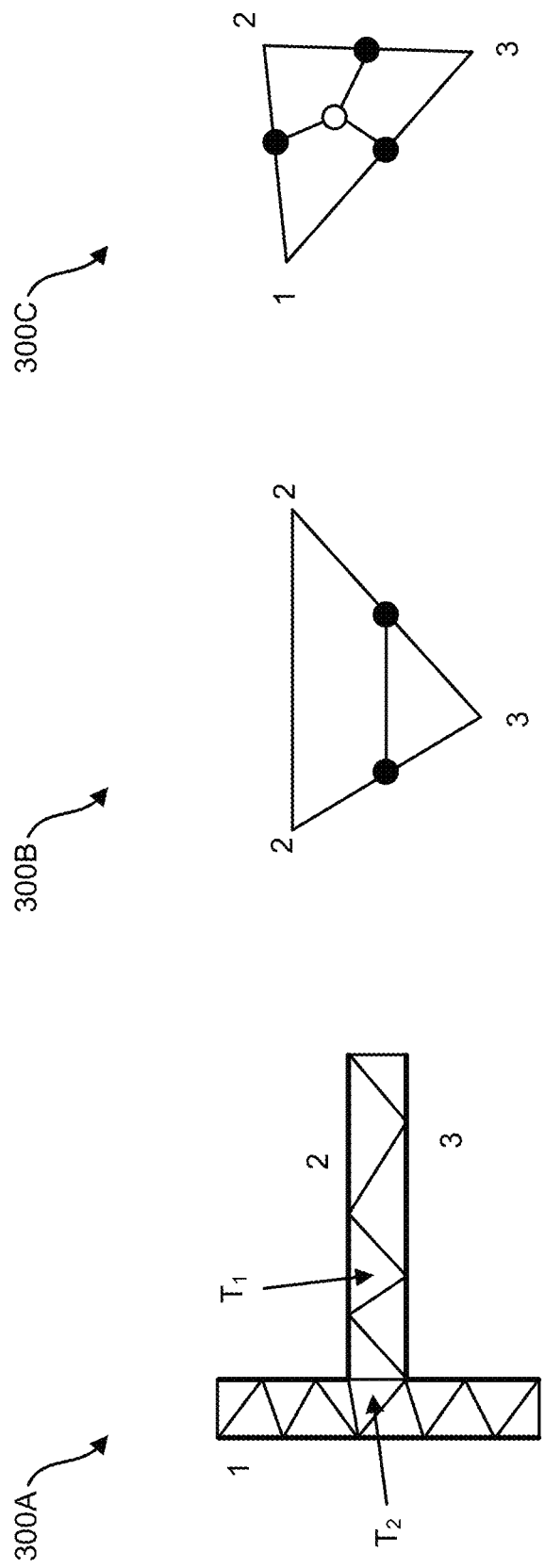
FIG. 3A is a diagram illustrating differing coding of triangles forming part of the mesh of the solid object of FIG. 2A.
FIG. 3B is a diagram illustrating generating a cutting for a triangle having a first vertex coding.
FIG. 3C is a diagram illustrating generating a cutting for a triangle having a second vertex coding.
Figure 4:
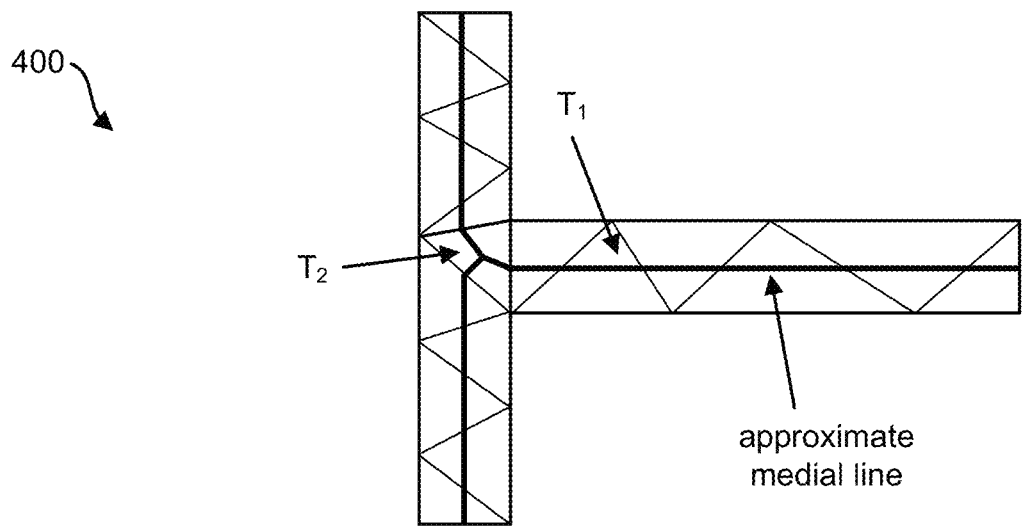
FIG. 4 is a diagram illustrating an approximate medial line for the solid object of FIG. 2A.

Diagrams 300A-300C of FIGS. 3A-C takes a close look at two triangular elements, T1 and T2 in FIG. 2C. T1 has two vertices (sometimes referred to herein as nodes) on the parallel boundary face coded as 2 and one vertex on the boundary face group 3. A cutting line segment can be created by connecting the middle of sides whose vertex codes are different as in FIG. 3B. T2 has vertices whose codes are all different as shown in FIG. 3C. In this case, a point is generated at the center of the triangle and linked to the middle of each side of the triangle. The techniques in FIGS. 3B and 3C for identifying the corresponding cuttings can be referred to as a template-based approach as there are two techniques for generating a cutting based on the vertex coding. In 2D, the cutting can take the form of a line or curve and in 3D, the cutting can take the form of a polygon. The collection of the cuttings represents (i.e., approximates) the medial surface as illustrated in diagram 400 of FIG. 4 (in which all of the cuttings use the template T1 of FIG. 3B with the exception of cutting 410 which uses the template T2 of FIG. 3C).

Figure 5:
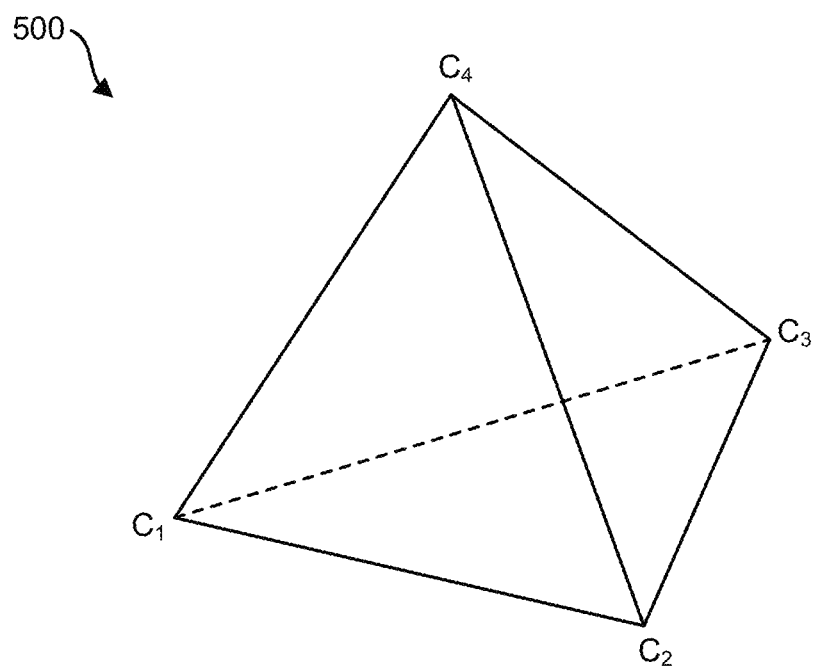
FIG. 5 is a diagram illustrating an example tetrahedral element having four nodes.
Figure 6A:
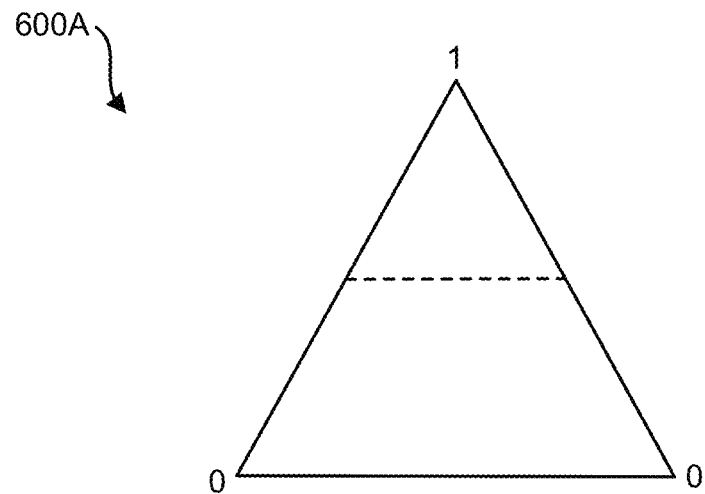
FIG. 6A is a diagram illustrating generating a cutting polygon for a triangle face forming part of a tetrahedral element having a first vertex coding.
Figure 6B:
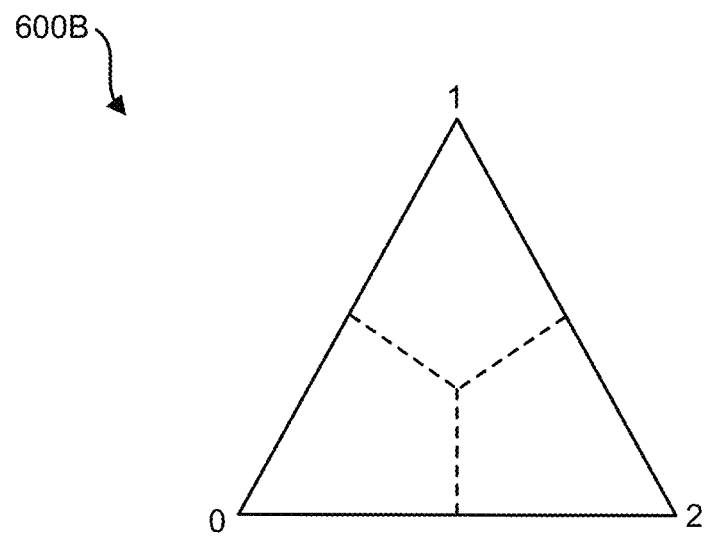
FIG. 6B is a diagram illustrating generating a cutting polygon for a triangle face forming part of a tetrahedral element having a second vertex coding.

FIG. 5. is a diagram 500 that illustrates tetrahedral elements of codes at each vertex whose triangular sides are one of the two types in diagrams 600A-600B of FIGS. 6A-6B.

Any tetrahedral element can be classified into one of the types in diagrams 700A-700D of FIGS. 7A-7D which respectively show different template-based approaches for generating a cutting based on the codes assigned to the vertices of the tetrahedral elements. FIG. 7A illustrates an arrangement in which three vertices have the same code, and as such, a cutting is constructed from each face of the tetrahedral element having at least one different vertex code similar based on a cut along the line such as in FIG. 6A. Stated differently, each outer face of the tetrahedral in FIG. 7A corresponds to the triangle of FIG. 6A and the middle cut on each outer face of the tetrahedral in FIG. 7A corresponds to the center line (in dashes) such as in FIG. 6A.

FIG. 7B illustrates a tetrahedral element in which two vertices have code 0 and two vertices have code 1. The cutting is constructed based on each outer face using, for example, a template similar to that of FIG. 6A which defines the cut locations on the outer face (which are extended inward as illustrated to form the cutting).

FIG. 7C illustrates a tetrahedral element in which two vertices have code 0, while one vertex has code 1, and the other vertex has code 2. The cutting in this case is formed using the template as in FIG. 6A for two faces (0-1-0) and (0-2-0), and the template in FIG. 6B for two faces (0-1-2) and (2-1-0).

Lastly, FIG. 7D illustrates a tetrahedral element in which each vertex has a different code (again meaning that each vertex of the tetrahedral element is on a different parallel boundary face). With such an arrangement, the template in FIG. 6B is used to construct the cutting for each face of the tetrahedral element of FIG. 7D (by defining the terminus of the cutting on each outer face of the tetrahedral element).

The templates provided herein enable the construction of cuttings in each tetrahedral element for all the tetrahedral element in a mesh. In some case, the polygons can be further triangulated for the ease of handling (i.e., triangles are always planar thus making geometry computations easier/faster, etc.). This triangle creation can be performed inside of a tetrahedron and be helpful to ensure conformity of the cutting triangles across tetrahedral element. For example, when sequentially generated cutting triangles, adjacent triangles will have vertices as a previously created triangle in the previous tetrahedron. This can be done by creating unique nodes at the vertices by the hashing or merging nodes with a distance tolerance within a distance tolerance into one node as part of post-processing.

Figure 8A:
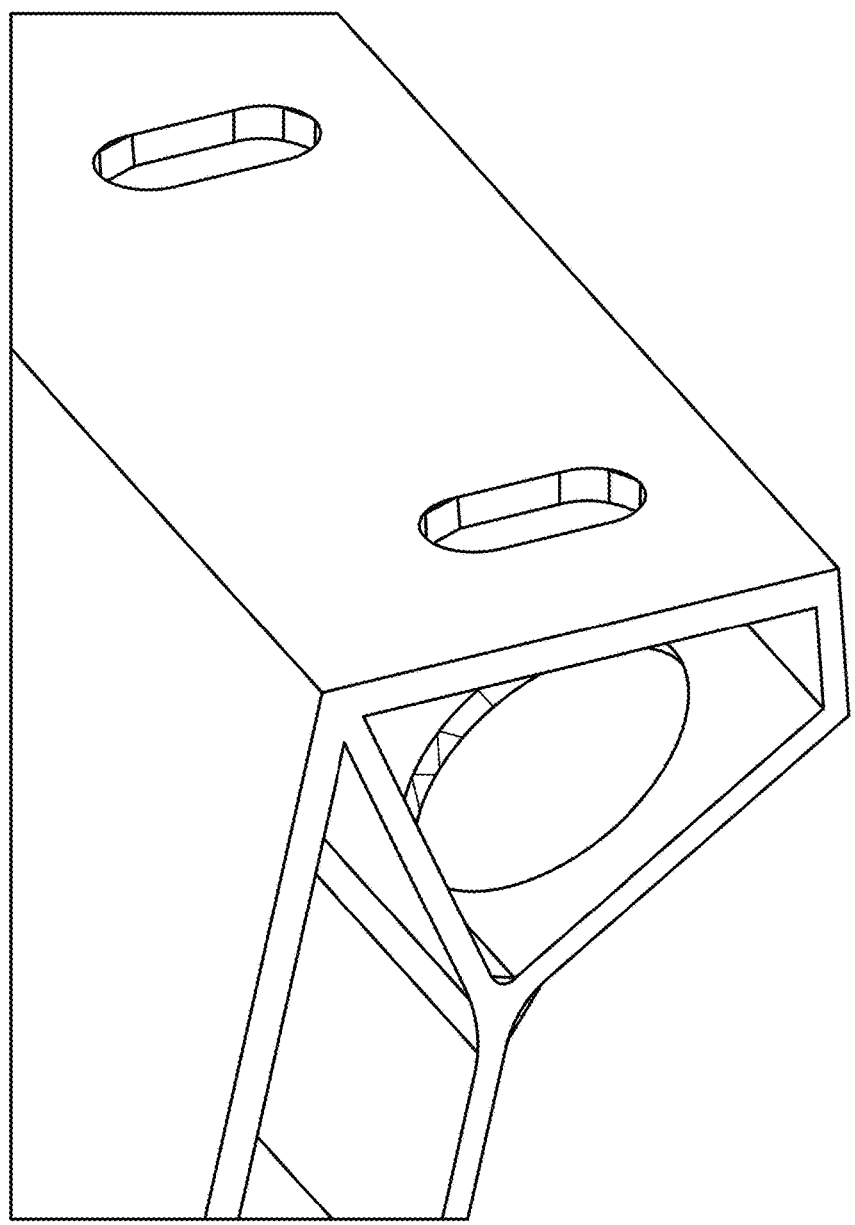
FIG. 8A is a diagram illustrating a portion of a non-manifold solid object.
Figure 8B:
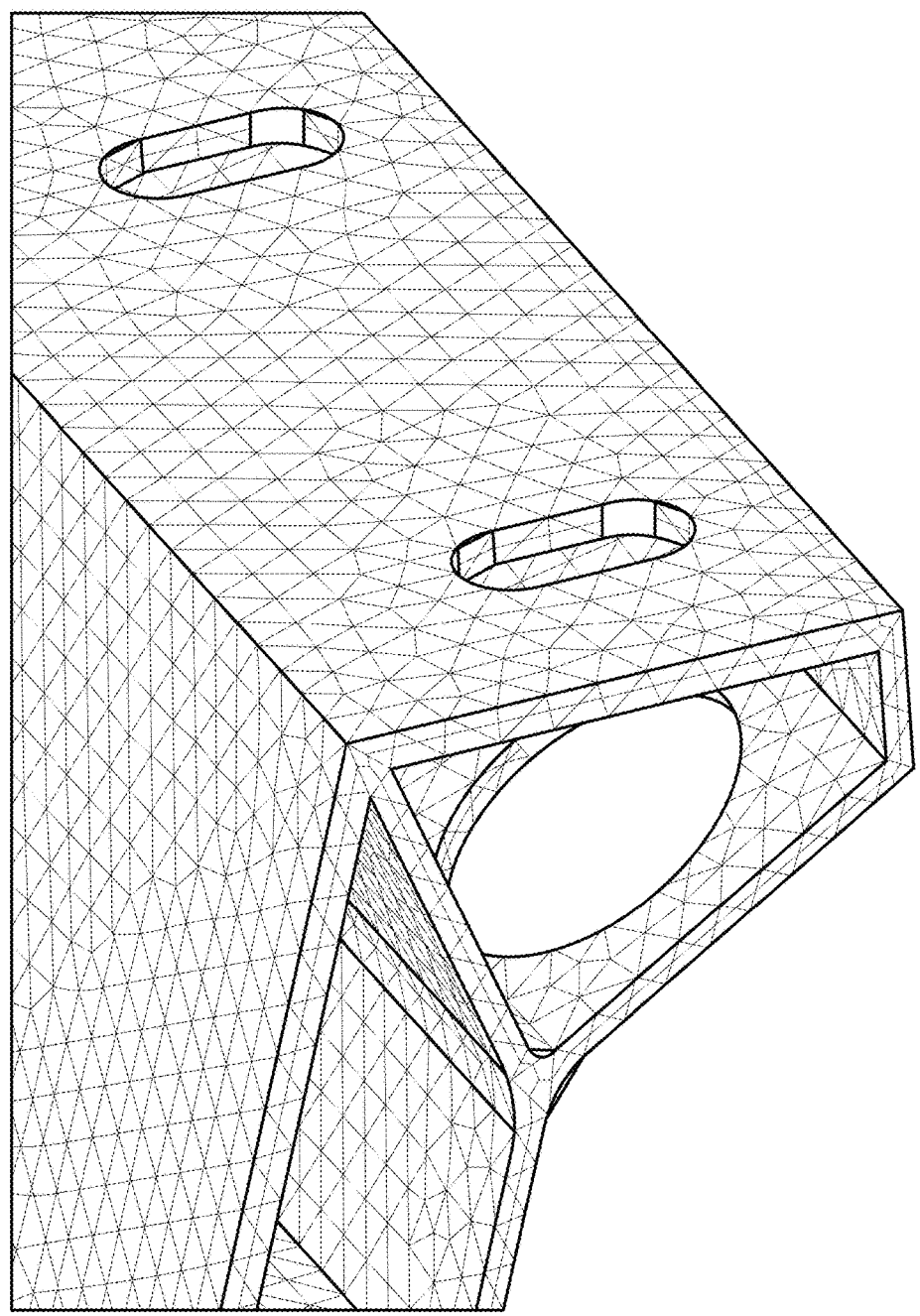
FIG. 8B is a diagram illustrating a boundary tetrahedral mesh applied to the non-manifold solid object of FIG. 8A.
Figure 8C:
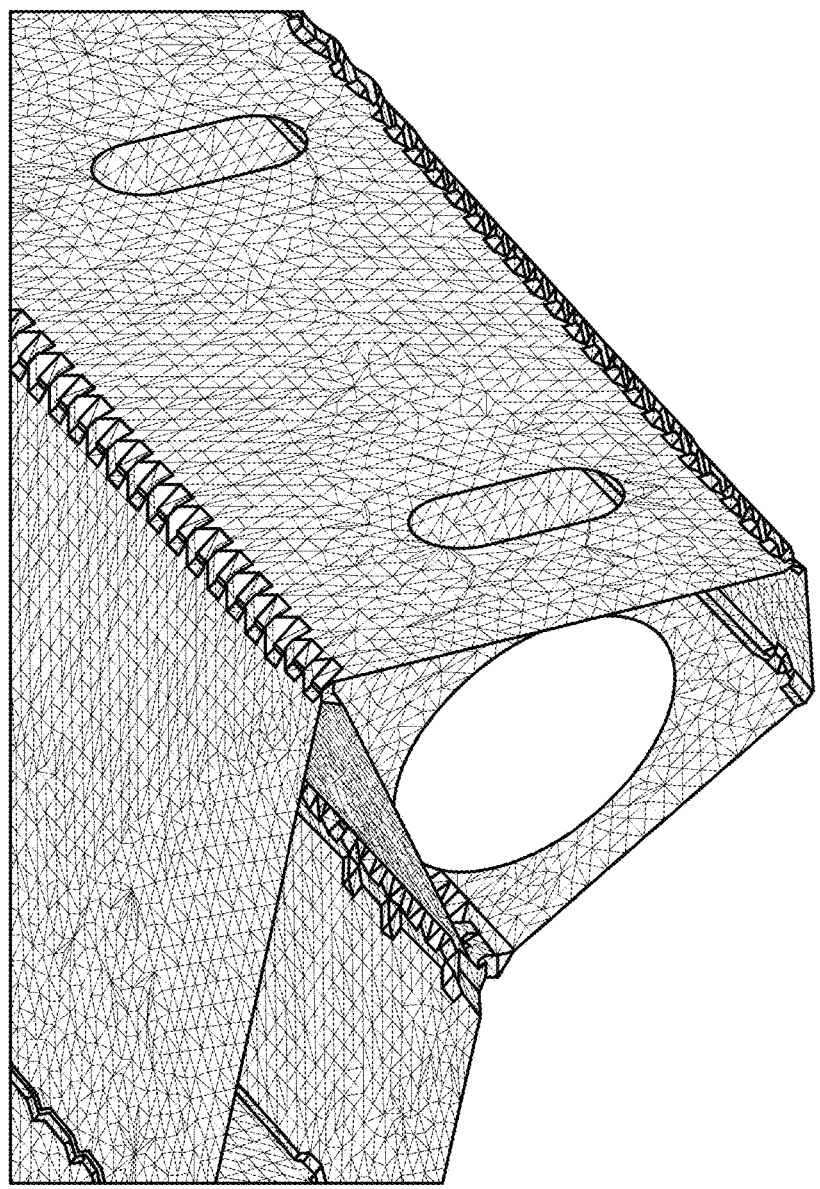
FIG. 8C is a diagram illustrating a representation of a medial surface constructed from the boundary tetrahedral mesh of FIG. 8B.
Figure 8D:
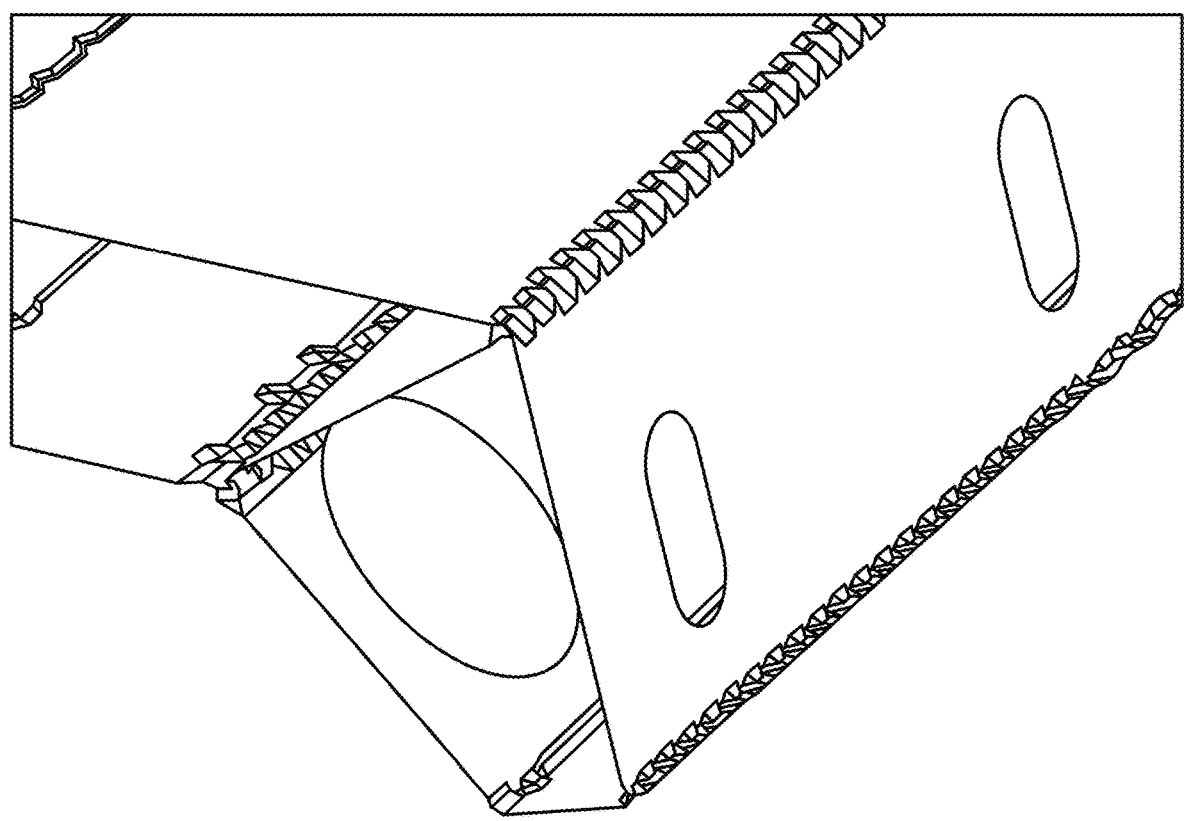
FIG. 8D is a diagram illustrating a solid version of the medial surface of FIG. 8C.
Figure 9A:
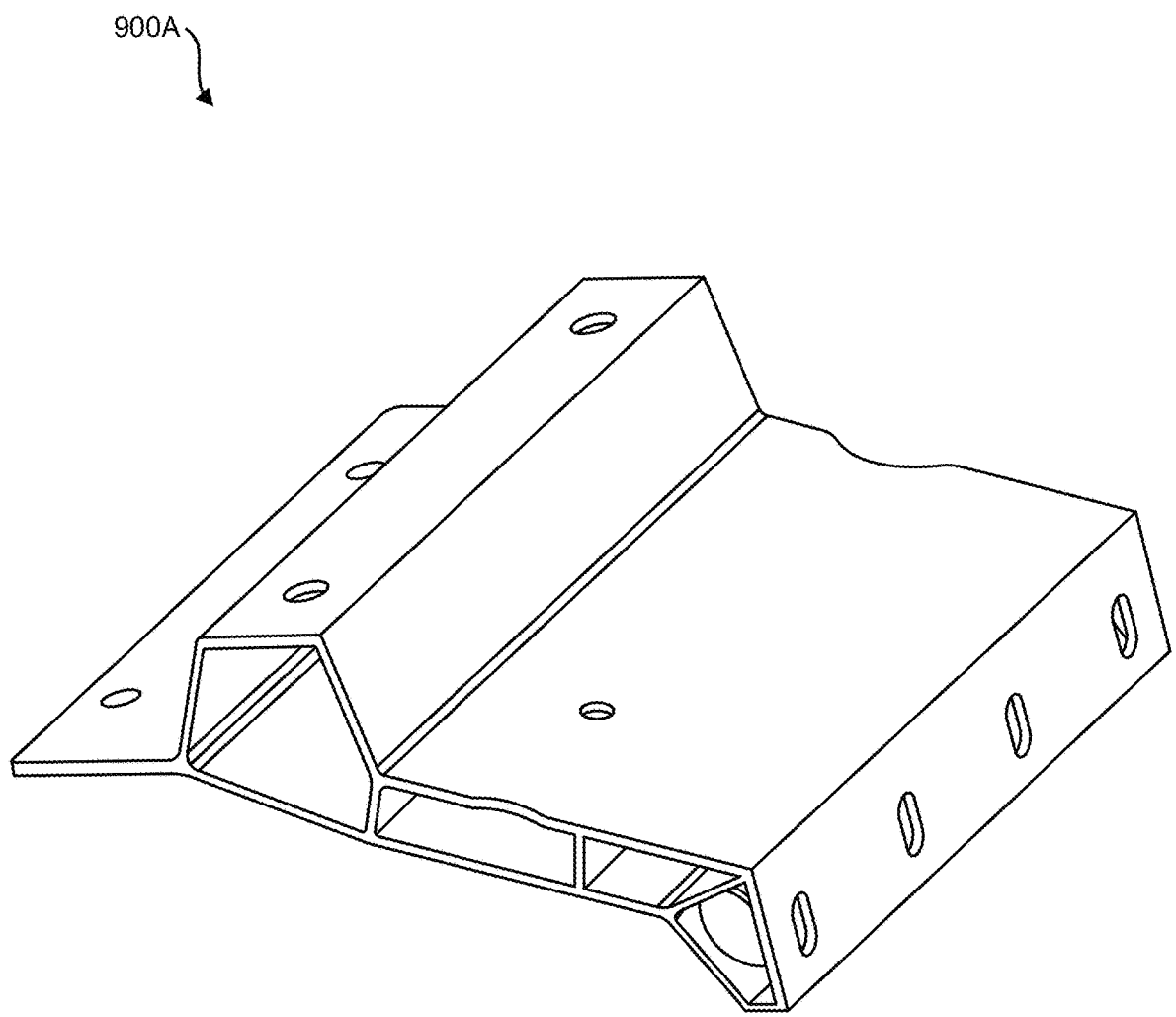
FIG. 9A is a diagram illustrating a non-manifold solid object.
Figure 9B:
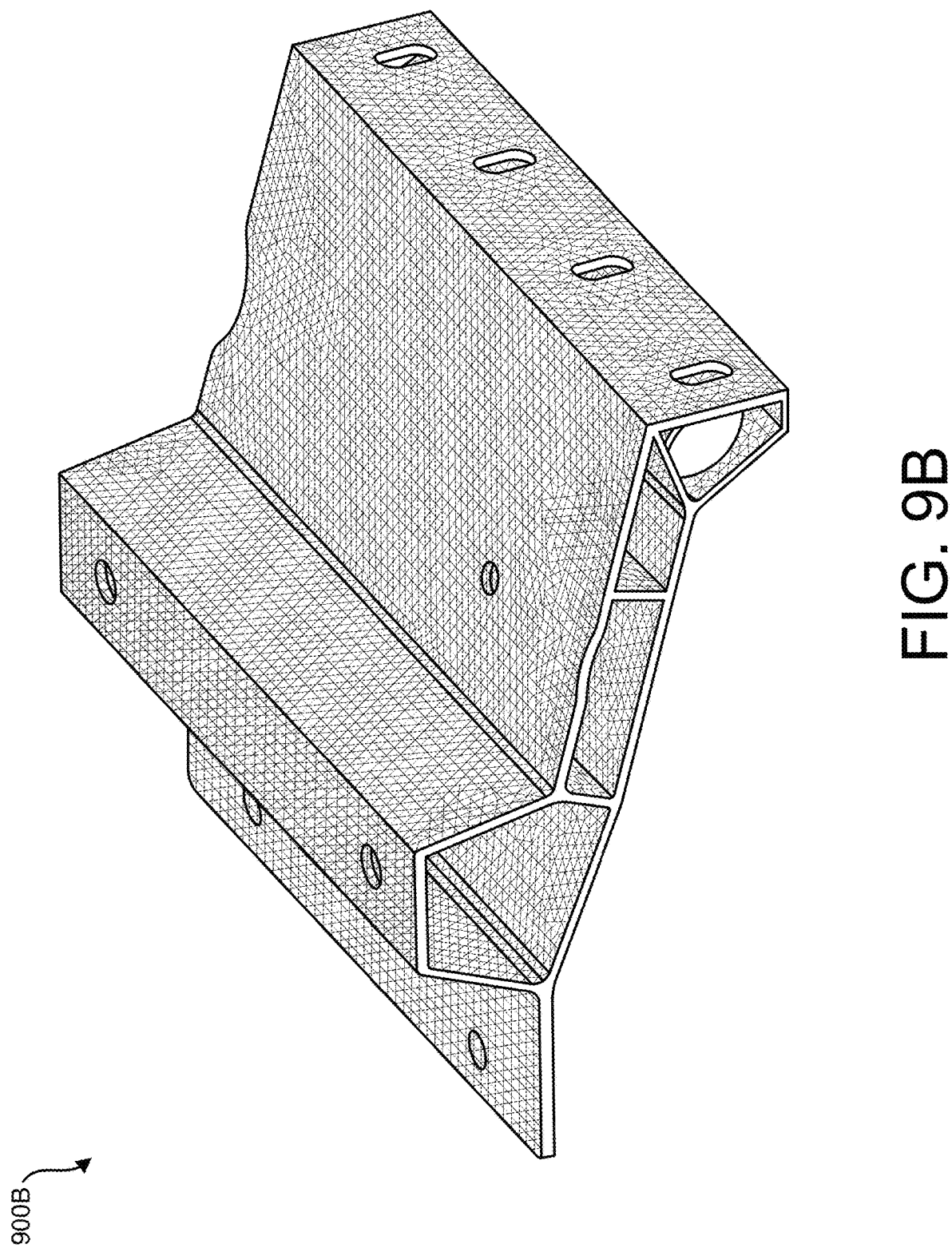
FIG. 9B is a diagram illustrating a boundary tetrahedral mesh applied to the non-manifold solid object of FIG. 9A.
Figure 9C:
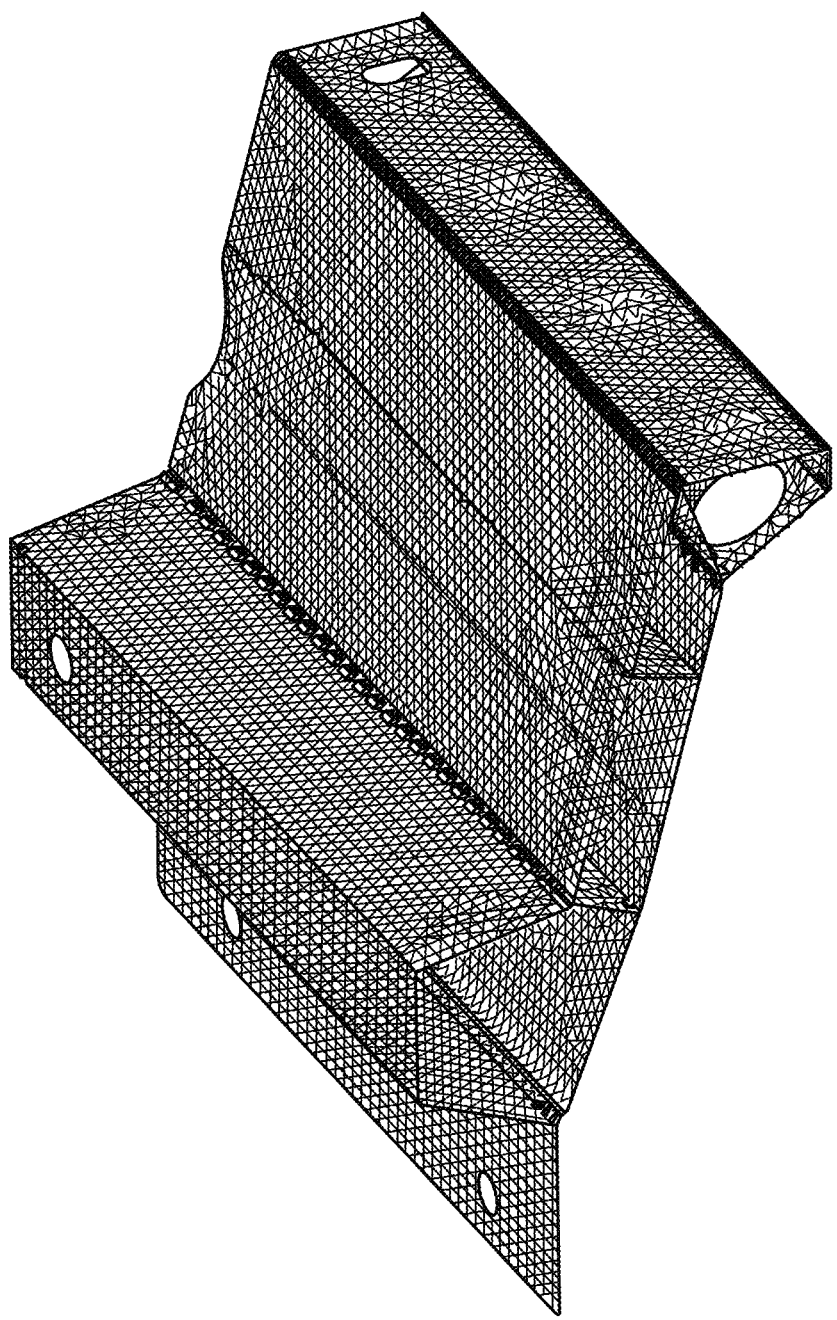
FIG. 9C is a diagram illustrating a medial surface constructed from the boundary tetrahedral mesh of FIG. 9B.
Figure 9D:
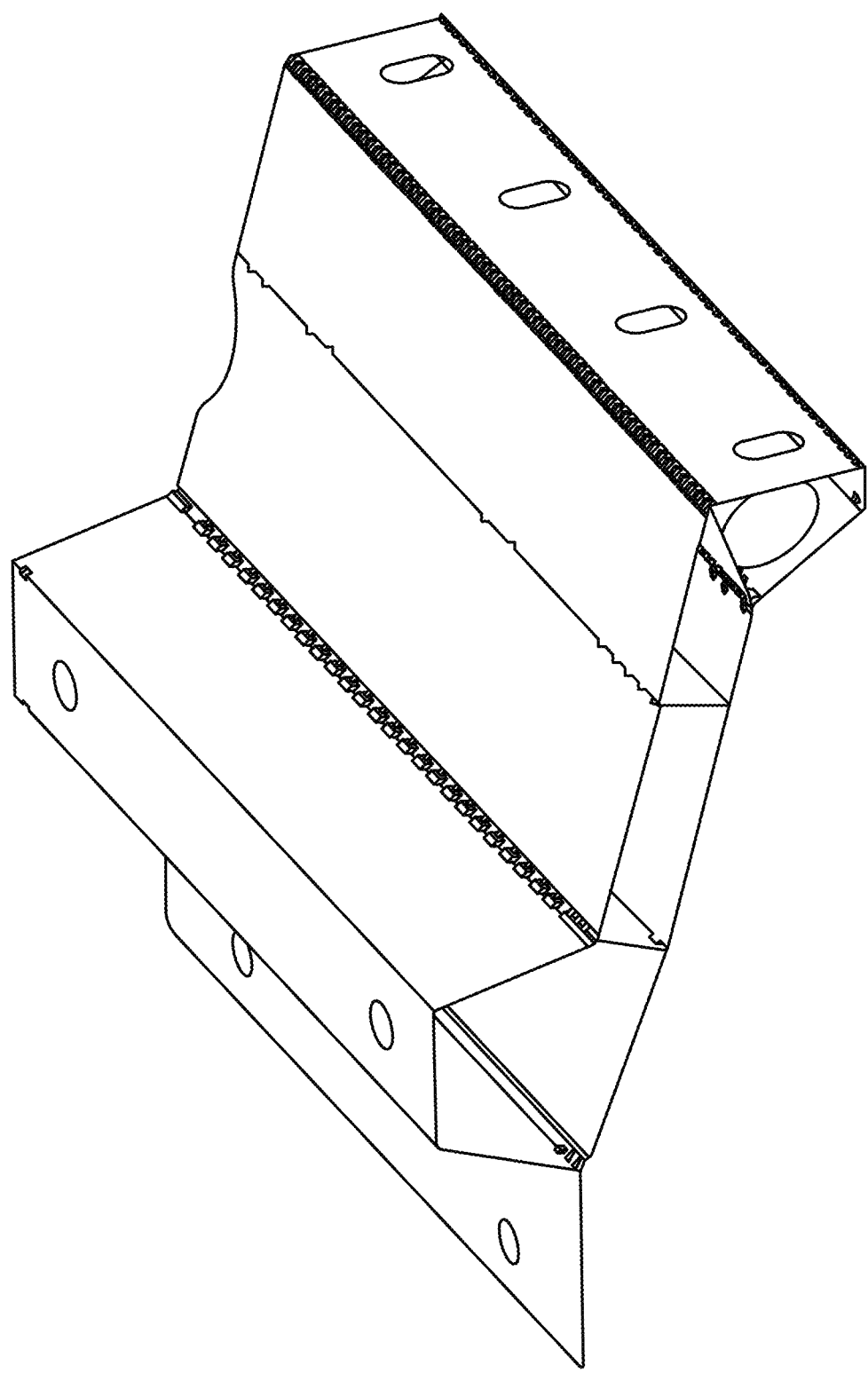
FIG. 9D is a diagram illustrating a solid version of the medial surface of FIG. 9C.

FIG. 8A is a diagram 800A showing a portion of a non-manifold solid object. FIG. 8B is a diagram 800B illustrating a corresponding boundary tetrahedral mesh (i.e., a tetrahedral mesh having no inner nodes) for the non-manifold solid object. FIG. 8C is a diagram 800C illustrating the calculated medial surface and FIG. 8D is a diagram 800D illustrating a solid representation of the medial surface of FIG. 8C. Similarly, diagram 900A shows the full non-manifold object. A boundary tetrahedral for the non-manifold solid object is shown in diagram 900B of FIG. 9B with diagram 900C of FIG. 9C showing the resulting calculated medial surface. FIG. 9D is a diagram 900D illustrating a solid representation of the medial surface of FIG. 9C constructed using the cuttings as provided herein. FIGS. 8A-9D are example visualizations of the solid object in a graphical user interface of a modeling software application. In some cases, the modeling software application can be executed locally on a client computing device, while in other cases, the modeling software application is a service executing on a remote computing device (and in either case the visualizations are on electronic display of the local client computing device).

Figure 10:
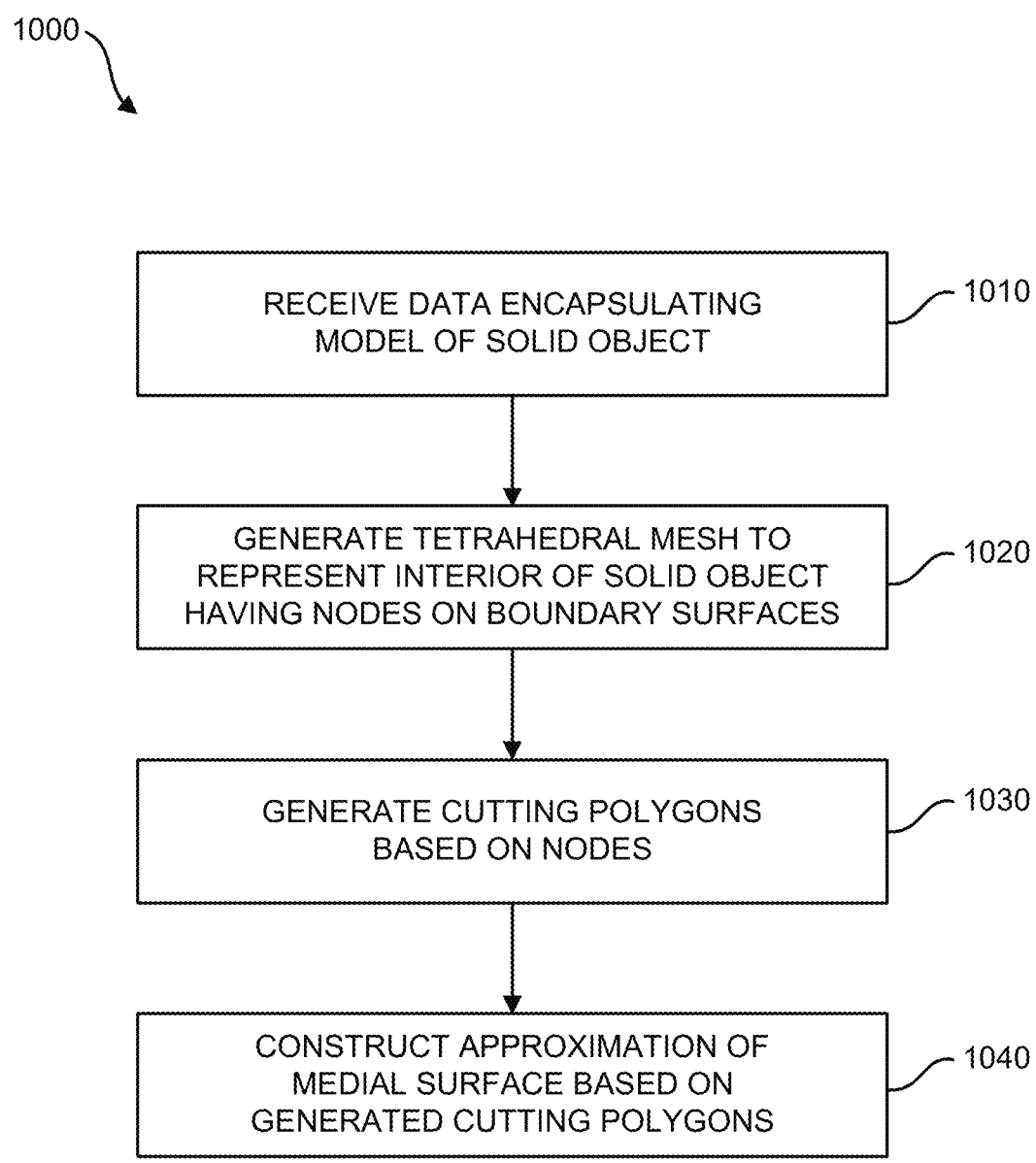
FIG. 10 is a second process flow diagram illustrating calculating a medial surface for a solid object.

FIG. 10 is a process flow diagram 1000 in which, at 1010, data is received that encapsulates or otherwise characterizes a model of a solid object. The model includes a set of boundary surfaces that are approximately parallel to the medial surface of the solid object. Thereafter, at 1020, a tetrahedral mesh is generated to represent an interior of the solid object with tetrahedral elements having nodes located on the boundary surfaces. Cuttings are then generated, at 1030, for each tetrahedral element based on the nodes. A representation of the medial surface (e.g., an approximation of the medial surface) of the solid object is then constructed, at 1040, based on the generated cuttings.

Figure 11:
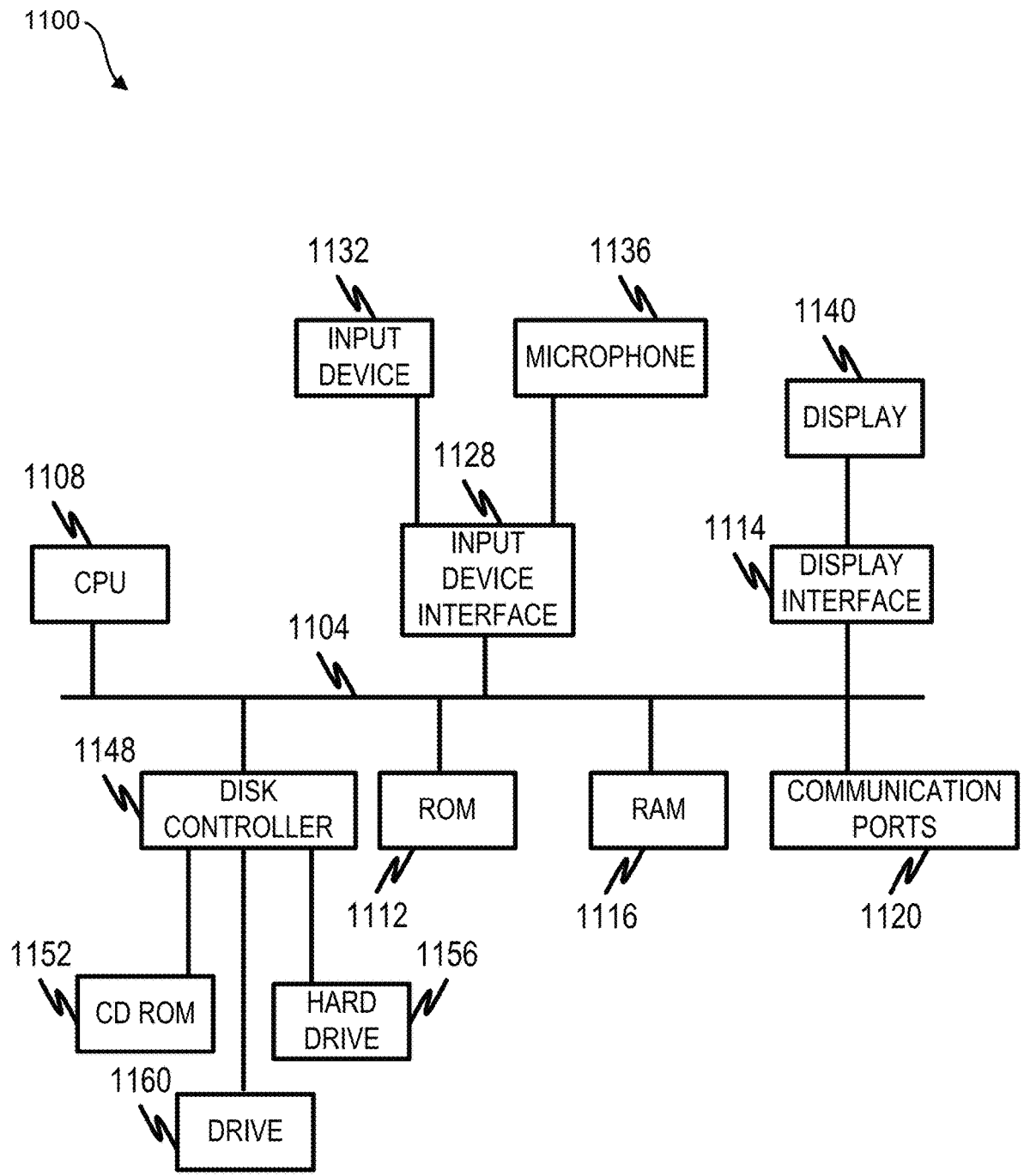
FIG. 11 is a diagram illustrating aspects of a computing device for implementing the current subject matter.

FIG. 11 is a diagram 1100 illustrating a sample computing device architecture for implementing various aspects described herein. A bus 1104 can serve as the information highway interconnecting the other illustrated components of the hardware. A processing system 1108 labeled CPU (central processing unit) (e.g., one or more computer processors/data processors at a given computer or at multiple computers), can perform calculations and logic operations required to execute a program. A non-transitory processor-readable storage medium, such as read only memory (ROM) 1112 and random access memory (RAM) 1116, can be in communication with the processing system 1108 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 1148 can interface with one or more optional disk drives to the system bus 1104. These disk drives can be external or internal disk drives such as 1160, external or internal CD-ROM, CD-R, CD-RW or DVD, or solid state drives such as 1152, or external or internal hard drives 1156. As indicated previously, these various disk drives 1152, 1156, 1160 and disk controllers are optional devices. The system bus 1104 can also include at least one communication port 1120 to allow for communication with external devices either physically connected to the computing system or available externally through a wired or wireless network. In some cases, the at least one communication port 1120 includes or otherwise comprises a network interface.

To provide for interaction with a user, the subject matter described herein can be implemented on a computing device having a display device 1140 (e.g., a CRT (cathode ray tube) or LCD (liquid crystal display) monitor) for displaying information obtained from the bus 1104 via a display interface 1114 to the user and an input device 1132 such as keyboard and/or a pointing device (e.g., a mouse or a trackball) and/or a touchscreen by which the user can provide input to the computer. Other kinds of input devices 1132 can be used to provide for interaction with a user as well; for example, feedback provided to the user can be any form of sensory feedback (e.g., visual feedback, auditory feedback by way of a microphone 1136, or tactile feedback); and input from the user can be received in any form, including acoustic, speech, or tactile input. The input device 1132 and the microphone 1136 can be coupled to and convey information via the bus 1104 by way of an input device interface 1128. Other computing devices, such as dedicated servers, can omit one or more of the display 1140 and display interface 1114, the input device 1132, the microphone 1136, and input device interface 1128.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving data encapsulating a model of a solid object, the model including a set of boundary surfaces that are approximately parallel to a medial surface of the solid object;
generating a tetrahedral mesh to represent an interior of the solid object with tetrahedral elements having nodes located on the boundary surfaces;
generating cuttings for each tetrahedral element based on the nodes using a template-based approach; and
constructing a representation of the medial surface of the solid object based on the generated cuttings.

2. The method of claim 1, wherein the cuttings include polygons.

3. The method of claim 1, wherein the cuttings include lines.

4. The method of claim 1 further comprising:
identifying the set of boundary surfaces that are approximately parallel to the medial surface of the solid object.

5. The method of claim 4 further comprising:
visualizing the solid object in a graphical user interface.

6. The method of claim 5 further comprising:
receiving user-generated input via the graphical user interface selecting the set of boundary faces that are approximately parallel to the medial surface of the solid object.

7. The method of claim 1, wherein the solid object is a non-manifold connected solid object.

8. The method of claim 1, wherein the template-based approach comprises:
assigning codes to vertices of the nodes based on the boundary surface on which they are located;
wherein the cuttings for each tetrahedral element are based on an associated tetrahedral template for the respective codes for the corresponding nodes.

9. The method of claim 8, wherein one of four codes is assigned to each vertex based on a contiguity of parallel faces on which such vertex resides.

10. The method of claim 1, wherein the tetrahedral mesh is generated so as to only have nodes on the boundary surfaces and no interior nodes.

11. The method of claim 1, wherein constructing the approximation of the medial surface of the solid object comprises combining each of the cuttings.

12. A system comprising:
at least one data processor; and
memory comprising instructions which, when executed by the at least one data processor, result in operations comprising:
receiving data encapsulating a model of a solid object, the model including a set of boundary surfaces that are approximately parallel to a medial surface of the solid object;
generating a tetrahedral mesh to represent an interior of the solid object with tetrahedral elements having nodes located on the boundary surfaces;
generating cuttings for each tetrahedral element based on the nodes using a template-based approach; and
constructing a representation of the medial surface of the solid object based on the generated cuttings.

13. The system of claim 12, wherein the cuttings are polygons.

14. The system of claim 12, wherein the cuttings are lines.

15. The system of claim 12, wherein the operations further comprise:
identifying the set of boundary surfaces that are approximately parallel to the medial surface of the solid object.

16. The system of claim 12, wherein the solid object is a non-manifold connected solid object.

17. The system of claim 12, wherein the template-based approach comprises:
assigning codes to vertices of the nodes based on the boundary surface on which they are located;
wherein the cuttings for each tetrahedral element are based on an associated tetrahedral template for the respective codes for the corresponding nodes.

18. The system of claim 12, wherein one of four codes is assigned to each vertex based on a contiguity of parallel faces on which such vertex resides.

19. The method of claim 1, wherein the tetrahedral mesh is generated so as to only have nodes on the boundary surfaces and no interior nodes and constructing the approximation of the medial surface of the solid object comprises combining each of the cuttings.

20. Non-transitory computer readable media comprising instructions which, when executed by at least one computing device, result in operations comprising:
- receiving data encapsulating a model of a solid object, the model including a set of boundary surfaces that are approximately parallel to a medial surface of the solid object;
- generating a tetrahedral mesh to represent an interior of the solid object with tetrahedral elements having nodes located on the boundary surfaces;
- generating cuttings for each tetrahedral element based on the nodes using a template-based approach; and
- constructing a representation of the medial surface of the solid object based on the generated cuttings.

* * * * *